Dec. 2, 1947.  P. G. GILBERT  2,431,802
WHEEL
Filed April 21, 1944
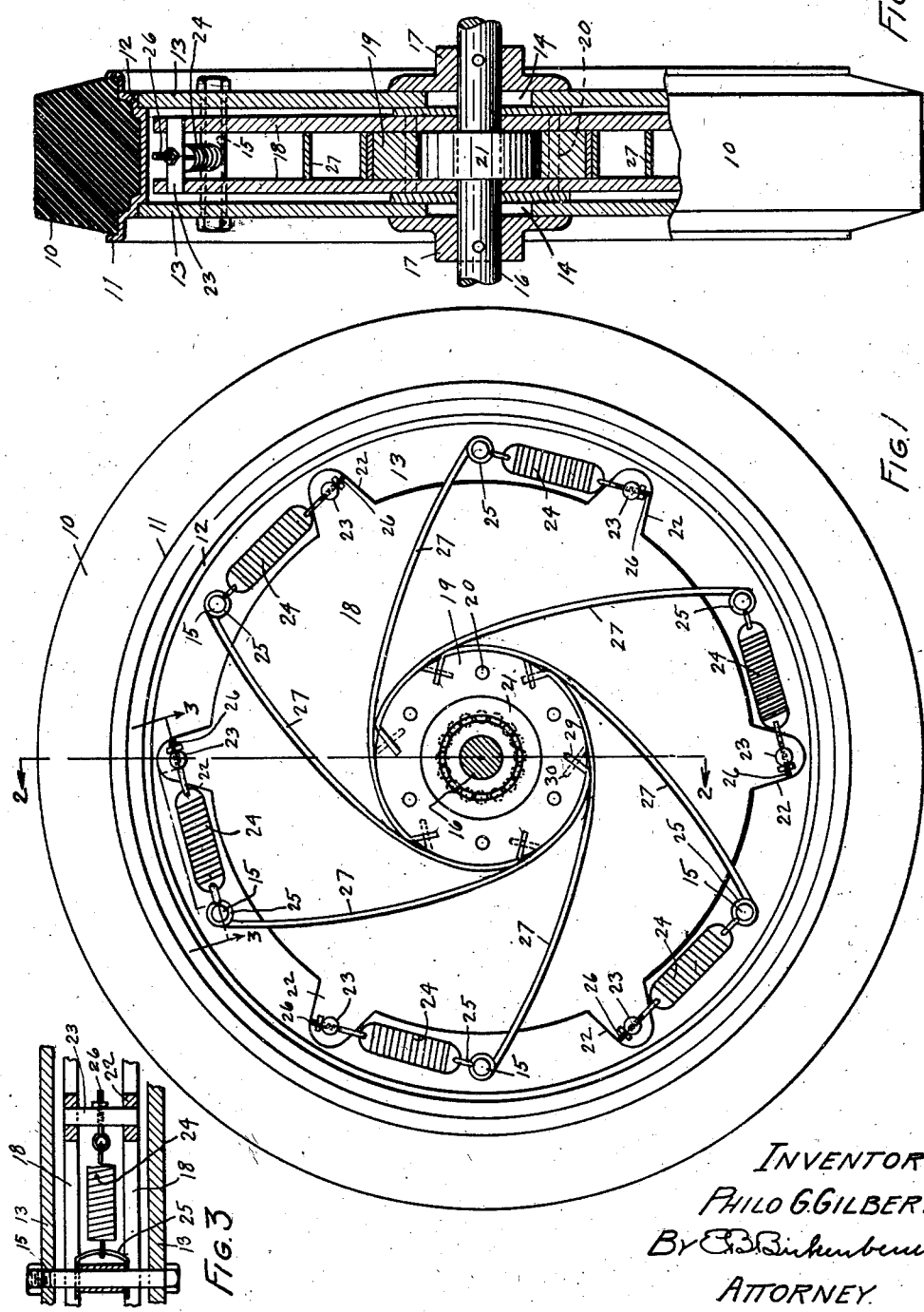
INVENTOR
PHILO G. GILBERT.
By [signature]
ATTORNEY.

Patented Dec. 2, 1947

2,431,802

UNITED STATES PATENT OFFICE 2,431,802

WHEEL

Philo G. Gilbert, Portland, Oreg.

Application April 21, 1944, Serial No. 532,062

1 Claim. (Cl. 152—83)

This invention relates generally to vehicles and particularly to wheels for supporting vehicles.

The main object of this invention is to provide an improved form of wheel whereby the load is supported by springs from the periphery of the wheel, whose outer portion constitutes a continuous or circular arch which has uniformly distributed around same all of the stresses imposed upon the wheel, and prevents these stresses from being abruptly transferred to the axle upon which the wheel is mounted.

The second object is to lessen the shocks to the axle and tires, reduce crystallization of the metallic members and stop breakage of the tire walls, and ultimately add to the life of the vehicle, lessen the cost of operation and add to the comfort of riding.

A further object is to provide a resilient shock absorbing drive between the tire and the axle which will dampen out any abrupt application of power or retarding action due to braking.

A further object is to construct a wheel whose working parts require no grease and by means of which travel over rough or bumpy roads will be expedited.

A further object is to produce a wheel of the class described which will be useful on airplanes as well as on land traveling vehicles.

I accomplish these and other objects in a manner set forth in the following specification as illustrated in the accompanying drawing, in which:

Fig. 1 is a side elevation of my wheel with one of the outer plates removed.

Fig. 2 is a partial section taken along the line 2—2 in Fig. 1.

Fig. 3 is a fragmentary section taken along the line 3—3 in Fig. 1.

Similar numerals refer to similar parts throughout the several views.

Referring in detail to the drawing, there is shown, for the sake of illustration, a rubber tire 10 of the solid type and which is mounted on a rim 11 having an offset 12 formed therein to receive the outer plates 13, which are provided with the enlarged openings 14. The discs 13 are held together by means of the bolts 15. A shaft 16 passes axially through the openings 14 and has secured thereon the collars 17 which are free to move against the outer faces of the discs 13. Rotatable on the shaft 16 are the inner discs 18, between which is disposed the hub 19 which is secured to the disc 18 by means of the rivets 20. Within the hub 19 is placed the anti-friction bearing 21. This construction relates to the use of the device as a free wheel, that is, when the tire 10 is not to be driven by the shaft 16.

The plates 18 are provided with a plurality of radial ears 22 across which are mounted the rods 23 which constitute anchors for the tension springs 24, whose opposite ends are attached to the bolts 15 by means of the shackles 25 as shown in Fig. 3. It is desirable to attach the spring 24 to the rod 23 by means of an eye bolt 26 in order that the tension of the spring 24 may be better controlled. Attached to the hub 19 are the tangential resilient spokes 27, whose outer ends are attached to the bolts 15 and whose inner ends are held within the slots 29 by means of the pins 30. The tension on the springs 24 must be sufficient to hold the spokes 27 in sufficiently strong tension to hold the axis of the shaft 16 in register with the axis of the wheel 10. It follows that any load or driving torque imposed on the wheel would be transferred to the wheel by uniform application of power throughout its circumference. It also follows that this wheel will absorb, to a large degree, road shocks imposed by inequalities in the road and also the shock of an abruptly applied starting torque.

If the wheel is to be used as a driving member, that is if the tire 10 is to revolve with the shaft 16 at all times, then the antifriction bearing is omitted and the hub 19 is made to extend to the shaft 16 and is keyed thereto.

While I have thus illustrated and described my invention, it is not my intention to be limited to the precise form shown herein, but I do intend to cover all such forms and modifications thereof as fall fairly within the appended claim.

I claim:

A wheel having in combination an axle, a hub mounted on said axle, a pair of spaced inner discs secured to said hub, a pair of outer discs spaced from said shaft having a tire supporting rim around the outer edges thereof, a plurality of tangential resilient spokes secured in tension to said hub and anchored to said outer discs, and springs between said inner and outer discs adapted to urge same in opposite directions.

PHILO G. GILBERT.

REFERENCES CITED

The following references are of record in the file of this patent:

UNITED STATES PATENTS

| Number | Name | Date |
|---|---|---|
| 519,790 | Fox | May 15, 1894 |
| 697,341 | Hockett | Apr. 8, 1902 |
| 1,069,553 | Kepler | Aug. 5, 1913 |
| 1,084,664 | Schanck | Jan. 20, 1914 |
| 1,103,512 | Harrington | July 14, 1914 |
| 1,286,761 | Payne | Dec. 3, 1918 |